(12) United States Patent
Suzuki et al.

(10) Patent No.: US 6,330,524 B1
(45) Date of Patent: Dec. 11, 2001

(54) SCANNING OPTICAL SYSTEM

(75) Inventors: Takatoshi Suzuki; Tingwen Xing, both of Osaka (JP)

(73) Assignee: Nippon Aspehrical Lens Co., Ltd., Osaka (JP)

( * ) Notice: Subject to any disclaimer, the term of this patent is extended or adjusted under 35 U.S.C. 154(b) by 0 days.

(21) Appl. No.: 09/269,190

(22) PCT Filed: Jul. 29, 1998

(86) PCT No.: PCT/JP98/03378

§ 371 Date: May 20, 1999

§ 102(e) Date: May 20, 1999

(30) Foreign Application Priority Data

Jul. 30, 1997 (JP) .................................................. 9-204814

(51) Int. Cl.$^7$ .................................................. G01B 11/02
(52) U.S. Cl. ........................ 702/159; 702/150; 702/153; 345/158; 359/206; 359/662; 359/708
(58) Field of Search .................................. 702/150, 153, 702/159; 345/158; 359/206, 662, 708

(56) References Cited

U.S. PATENT DOCUMENTS

| | | | |
|---|---|---|---|
| 5,343,325 | * | 8/1994 | Yamakawa ............................ 359/205 |
| 5,748,356 | * | 5/1998 | Park et al. ............................ 359/207 |
| 5,805,324 | * | 8/1998 | Endou .................................. 359/208 |
| 5,884,239 | * | 3/1999 | Romanik .............................. 702/150 |
| 6,046,835 | * | 4/2000 | Yamawaki et al. ................... 359/205 |
| 6,067,106 | * | 5/2000 | Ishibe et al. ......................... 347/258 |
| 6,154,245 | * | 11/2000 | Kato ..................................... 347/244 |

* cited by examiner

Primary Examiner—Arthur T. Grimley
Assistant Examiner—John Le
(74) Attorney, Agent, or Firm—Arent Fox Kintner Plotkin & Kahn, PLLC (57) ABSTRACT

The present invention has the object to make an fØ lens constituting a scanning optical system such as a laser printer, etc., which is of a single lens configuration, and higher in resolution, thereby providing the fθ lens provided with a lens performance so as to correspond to an A3 paper size or the like. The fθ lens is designed by the aspherical formula as follows:

$$Z = \frac{C_x X^2}{1 + \sqrt{1 - (1+K)C_x^2 X^2}} + \sum_{n=3}^{u} A_n |X^n| + \frac{C_y Y^2 \left(1 + \sum_{m=2}^{w} B_m |X^m|\right)}{1 + \sqrt{1 - \left[1 + K_y\left(1 + \sum_{j=1}^{v} G_j X^{2j}\right)\right]\left[C_y^2 Y^2 \left(1 + \sum_{m=2}^{w} B_m |X^m|\right)^2\right]}}$$

$$C_x = 1/R_x$$
$$C_y = 1/R_y$$

where
Cx, K, An, Cy, Bm, Ky, and Gj are each an optional coefficient; and
u, v, and w are each an integer.

The fθ lens is further designed by using an optional term containing an odd-numbered degree and an even-numbered degree for each of $\Sigma A_n |X^n|$, $\Sigma B_m |X^m|$, and $\Sigma G_j X^{2j}$ in the aspherical formula representing a shape of each of an incident surface or an outgoing surface of the fθ lens.

5 Claims, 10 Drawing Sheets

$$Z = \frac{C_y Y^2}{1 + \sqrt{1 - (1+K)C_y^2 Y^2}} + \sum_{n=2}^{20} A_n Y^{2n}$$

$$Z = \frac{C_x X^2}{1+\sqrt{1-(1+K)C_x^2 X^2}} + \sum_{n=3}^{u} A_n |X^n|$$

$$+ \frac{C_y Y^2 (1+ \sum_{m=2}^{w} B_m |X^m|)}{1+\sqrt{1-[1+K_y(1+\sum_{j=1}^{v} G_j X^{2j})][C_y^2 Y^2(1+\sum_{m=2}^{w} B_m |X^m|)^2]}}$$

$$C_x = 1/R_x$$
$$C_y = 1/R_y$$

(a)

(b) Minus side / Plus side — Main scanning → X (c) Sub-scanning → Y

Left-Right asymmetrical lens

SCANNING OPTICAL SYSTEM

TECHNICAL FIELD

The present invention relates to an fØ lens for use in a scanning optical system.

BACKGROUND TECHNOLOGY

Figure 10:
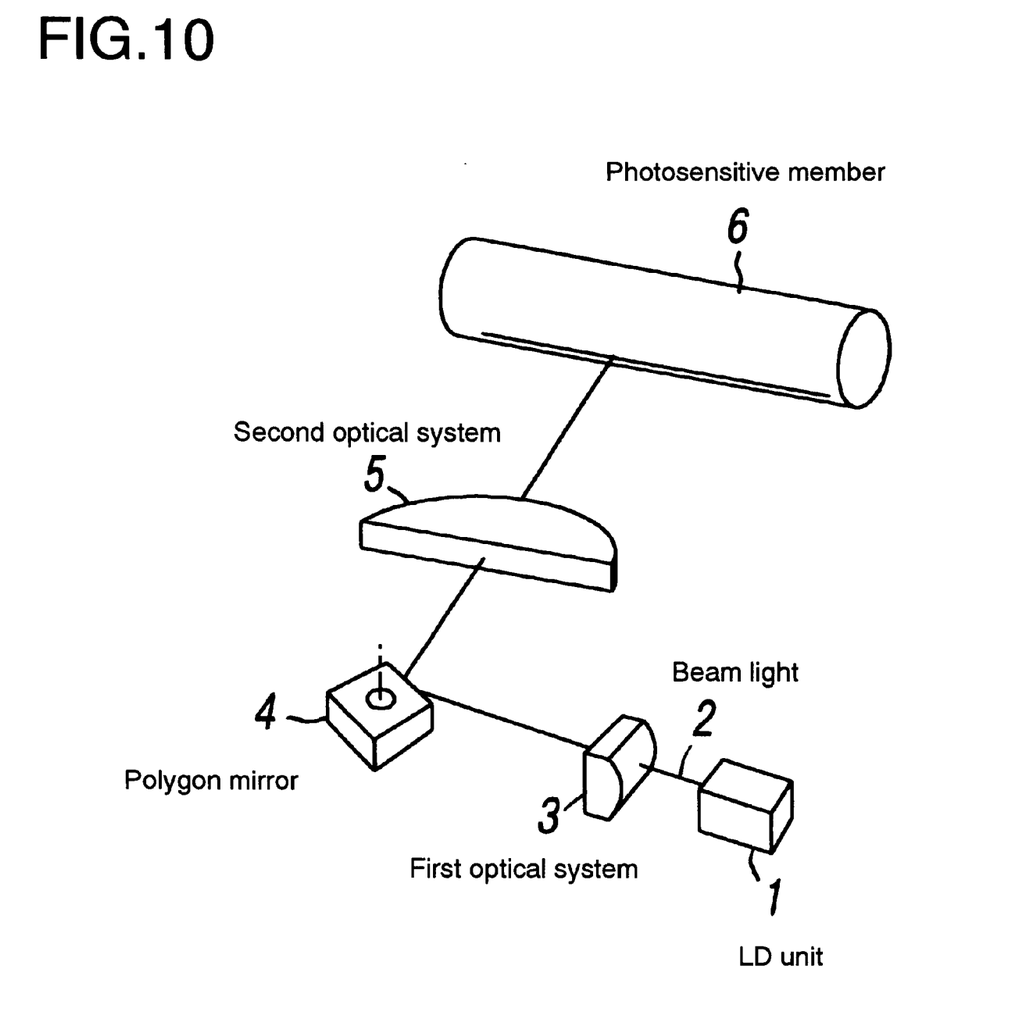
FIG. 10 is a view showing a general configuration of a scanning optical system.

A scanning optical system A for use with a printing unit such as a laser printer, copying machine, facsimile machine and the like has generally a configuration as shown in FIG. 10.

In FIG. 10, reference numeral 1 sets forth an LD unit with a semiconductor laser and the like installed therein, which emits a minutely converged beam light 2. Reference numeral 3 sets forth a first optical system which converges the beam light 2 only in a sub-scanning direction (in a direction in which a photosensitive drum rotates). Reference numeral 4 sets forth a polygon mirror which assigns the beam light into a main scanning direction upon rotating. Reference numeral 5 sets forth a second optical system composed of an fθ lens, which converges the beam light into the main scanning direction (an axial direction of the photosensitive drum) and the sub-scanning direction to form an electrostatic latent image by the converged imaging on a photosensitive member 6 of the photosensitive drum or the like.

It is to be noted herein that the second optical system 5 is required to have the function of an fθ lens compensation (compensation for linearly maintaining a relationship (X=fθ) of a rotating angle θ/2 of the polygon mirror with a scanning position X of the image formation on the photosensitive drum, in addition to the converging action. At this end, in usual occasions, the second optical system comprises a combination of two or three lenses.

On the other hand, in order to reduce a number of parts and to make the scanning optical system compact in size and light in weight, an fθ lens composed of a single lens is proposed (Japanese Patent Unexamined Publication No. 5-323,223).

This proposed fθ lens is designed so as to have the generating line corresponding to the main scanning direction represented by an aspherical formula as follows:

$$X = \frac{Y^2/R}{1 + \sqrt{1-(1+K)(Y/R)^2}} + B_4 Y^4 + B_6 Y^6 + B_8 Y^8 + B_{10} Y^{10}$$

where

R is the radius of the curvature; and

K, $B_4$, $B_6$, $B_8$, and $B_{10}$ are each an aspherical coefficient; and to have the meridional line corresponding to the sub-scanning direction represented by the formula representing a toric plane as follows:

$$S = \frac{Z^2/r}{1 + \sqrt{1-(Z/r')^2}}$$

Further, the technology as disclosed in the above Japanese patent publication is configured such that a slit-shaped diaphragm extending in the main scanning direction is disposed immediately in front of the fθ lens so as to make the F-number in the sub-scanning direction constant regardless of the beam spot position on the photosensitive member.

When the fθ lens having a single lens configuration composed of the aspherical lens as described above is used, the above patent publication discloses to the effect that the optical performance of the scanning optical system is indicated so as to form a spot having a diameter of 120 μm or larger on the photosensitive member.

In the fθ lens using the conventional designing formula as described above, the aspherical formula corresponds to the main scanning direction only. The sub-scanning direction is configured by the toric plane of a simple form and is designed so as to make the F-number constant in the combination with the slit-shaped diaphragm. The conventional configuration, however, suffers from the disadvantage that performance necessary for high resolution cannot be achieved for reasons, for instance, due to the difficulty in making the spot size minute. This may cause the problem particularly when the projection magnification should be made larger so as to extend the scanning width L on the photosensitive member to correspond to, e.g., an A3 paper size.

Therefore, the present invention has the object to provide an fθ lens so adapted as to readily make resolution higher by devising an aspherical formula for use in designing, even if it is composed of a single lens and no slit is disposed.

DISCLOSURE OF THE INVENTION

The present invention provides a scanning optical system for reflecting a beam light generated from a light source on a rotating polygon mirror and for scanning the beam light and forming an image on a photosensitive member through an fθ lens for converging the beam light and effecting the fθ compensation, in which the fθ lens is represented by the formula (1) as follows:

$$Z = \frac{C_x X^2}{1 + \sqrt{1-(1+K)C_x^2 X^2}} + \sum_{n=3}^{u} A_n |X^n| + \\ \frac{C_y Y^2 \left(1 + \sum_{m=2}^{w} B_m |X^m|\right)}{1 + \sqrt{1 - \left[1 + K_y\left(1 + \sum_{j=1}^{v} G_j X^{2j}\right)\right]\left[C_y^2 Y^2 \left(1 + \sum_{m=2}^{w} B_m |X^m|\right)^2\right]}} \tag{1}$$

$$C_x = 1/R_x$$
$$C_y = 1/R_y$$

where

Cx, K, An, Cy, Bm, Ky, and Gj are each an optional coefficient; and u, v, and w are each an integer.

The scanning optical system is further characterized in that the fθ lens is designed in a single-lens configuration by using an optional term containing an odd-numbered degree and an even-numbered degree in each of $\Sigma A_n|X^n|$, $\Sigma B_m|X^m|$ and $\Sigma G_j X^{2j}$ in the aspherical formula representing the shape of an incident surface or an outgoing surface of the fθ lens, as represented above.

The above aspherical formula (1) represents the height Z in the light-axial direction of the lens surface with respect to the position X in the main scanning direction and the position Y in the sub-scanning direction. The lens surface of the fθ lens defined by the aspherical formula (1) has a shape extending each along the main scanning direction (the X-axis) and the sub-scanning direction (the Y-axis) formed by a free curve.

The free curve in the main scanning direction is defined by the sum of the first and second terms of the above aspherical formula (1) as follows:

$$\frac{C_x X^2}{1+\sqrt{1-(1+K)C_x^2 X^2}} + \sum_{n=3}^{u} A_n |X^n| \quad C_x = 1/R_x$$

On the other hand, the free curve in the sub-scanning direction is defined by the third term of the above aspherical formula (1) as follows:

$$\frac{C_y Y^2 \left(1 + \sum_{m=2}^{w} B_m |X^m|\right)}{1+\sqrt{1-\left[1+K_y\left(1+\sum_{j=1}^{v} G_j X^{2j}\right)\right]\left[C_y^2\left(Y^2\left(1+\sum_{m=2}^{w} B_m |X^m|\right)\right)^2\right]}} \quad C_y = 1/R_y$$

The first term represents a basic curve represented by a curvature Cx in the X-axial direction (a reciprocal number of a radius Rx) and an eccentricity K. A free curve which changes in the main scanning direction X as indicated in FIG. 4(b) is formed by adding a plurality of n-th curves using X of the second term as a variable to the basic curve.

The third term is a term that changes a curvature Cy in the Y-axial direction (a reciprocal number of a radius Ry), which determines a YZ sectional shape, and an eccentricity Ky in accordance with an X-axial position. In other words, a plurality of m-th functions using X as a variable is added to 1, and the sum as a coefficient is then multiplied by the curvature Cy. Further, the sum obtained by adding the sum of plural (2j)-th functions using X as a variable to 1 is multiplied as a coefficient by the eccentricity Ky.

Figure 4:
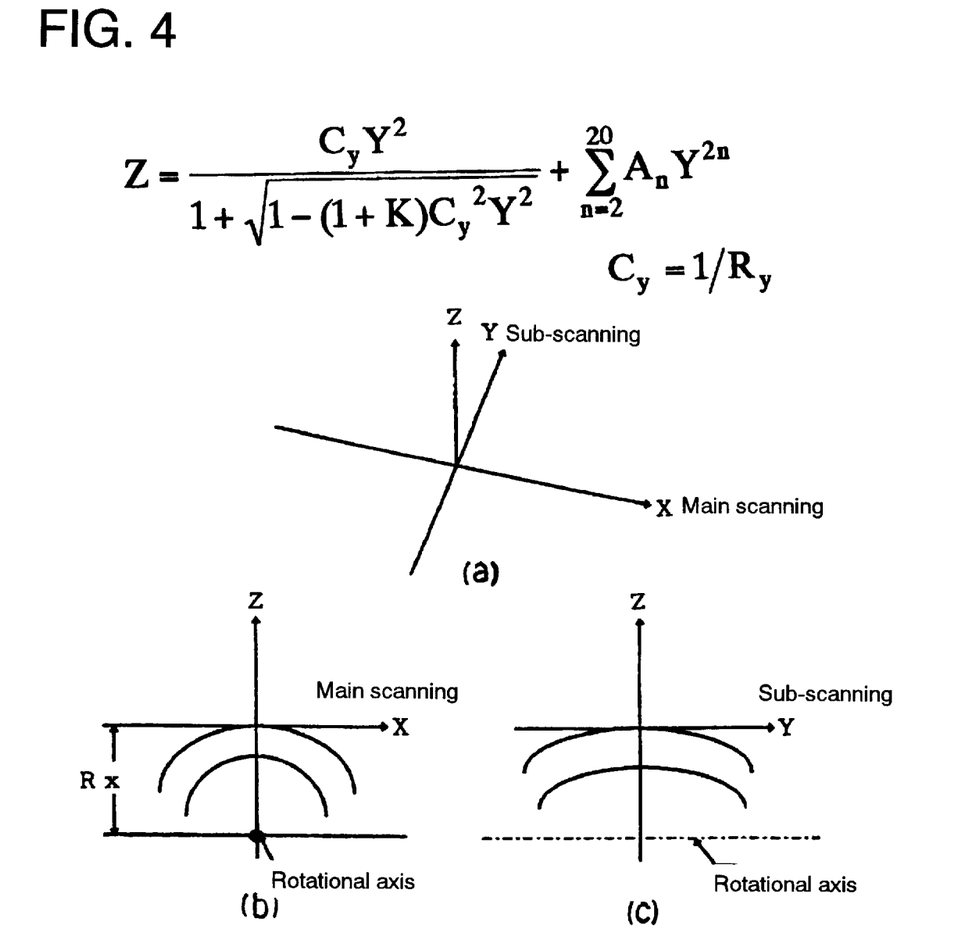
FIG. 4 is a view showing the relationship of coordinate axes of a aspherical formula representing a first optical system to be used for the present invention with the shape of a lens.
Figure 5:
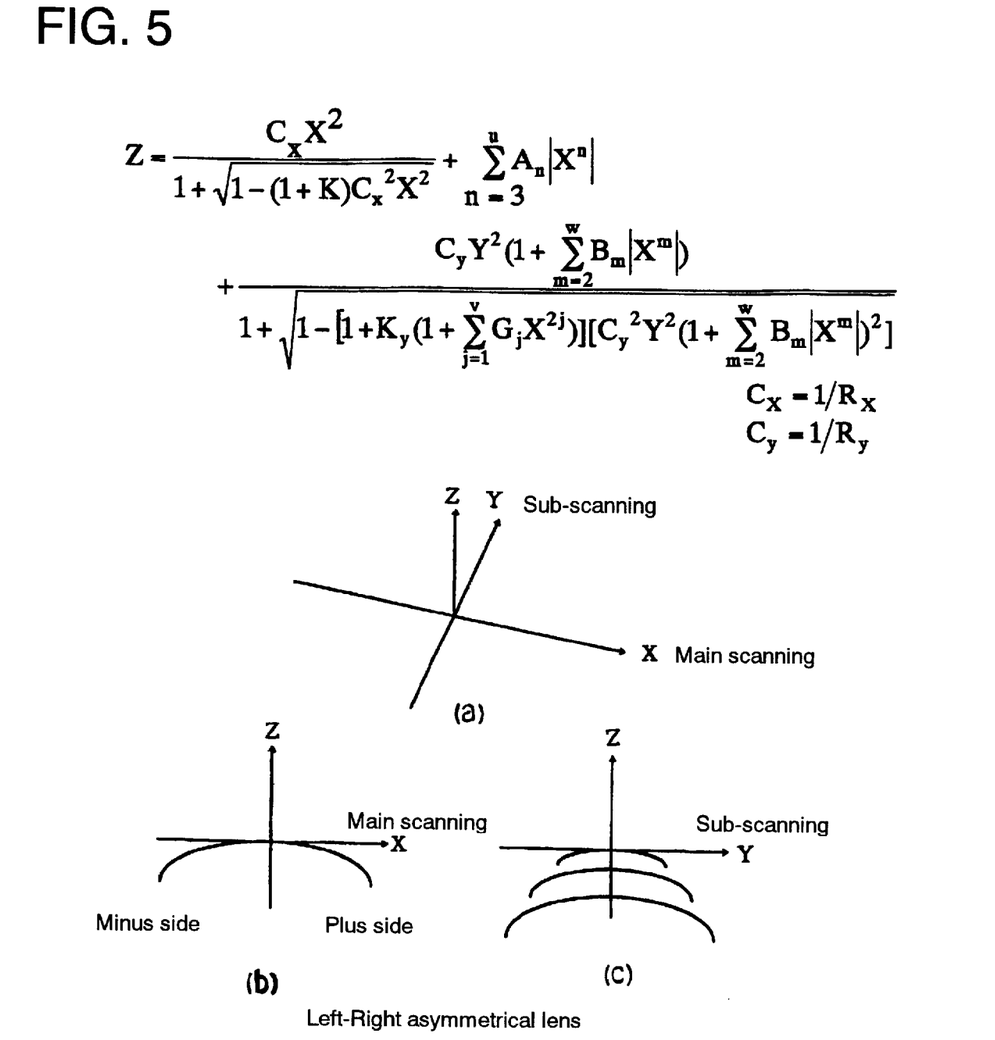
FIG. 5 is a view showing the relationship of coordinate axes of a aspherical formula representing a second optical system to be used for the present invention with the shape of a lens.

The free curve extending along the sub-scanning direction Y can be formed into a desired shape as shown in FIG. 4(c) by changing the eccentricity and the curvature in accordance the position X in the main scanning direction by optionally changing the (2j)-th function and the m-th function.

Figure 1:
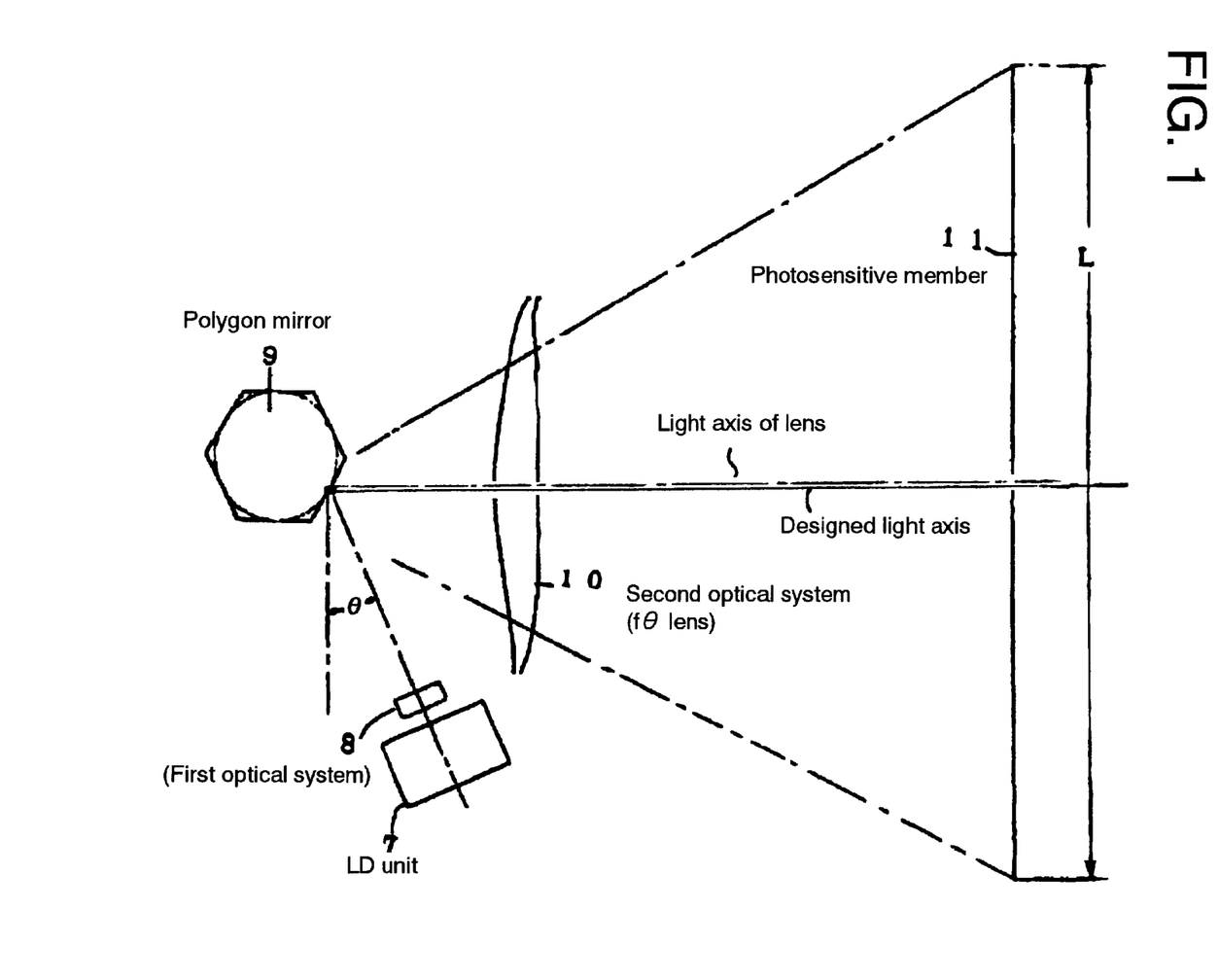
FIG. 1 is a schematic view showing an embodiment of the configuration of a scanning optical system according to the present invention.
Figure 3:
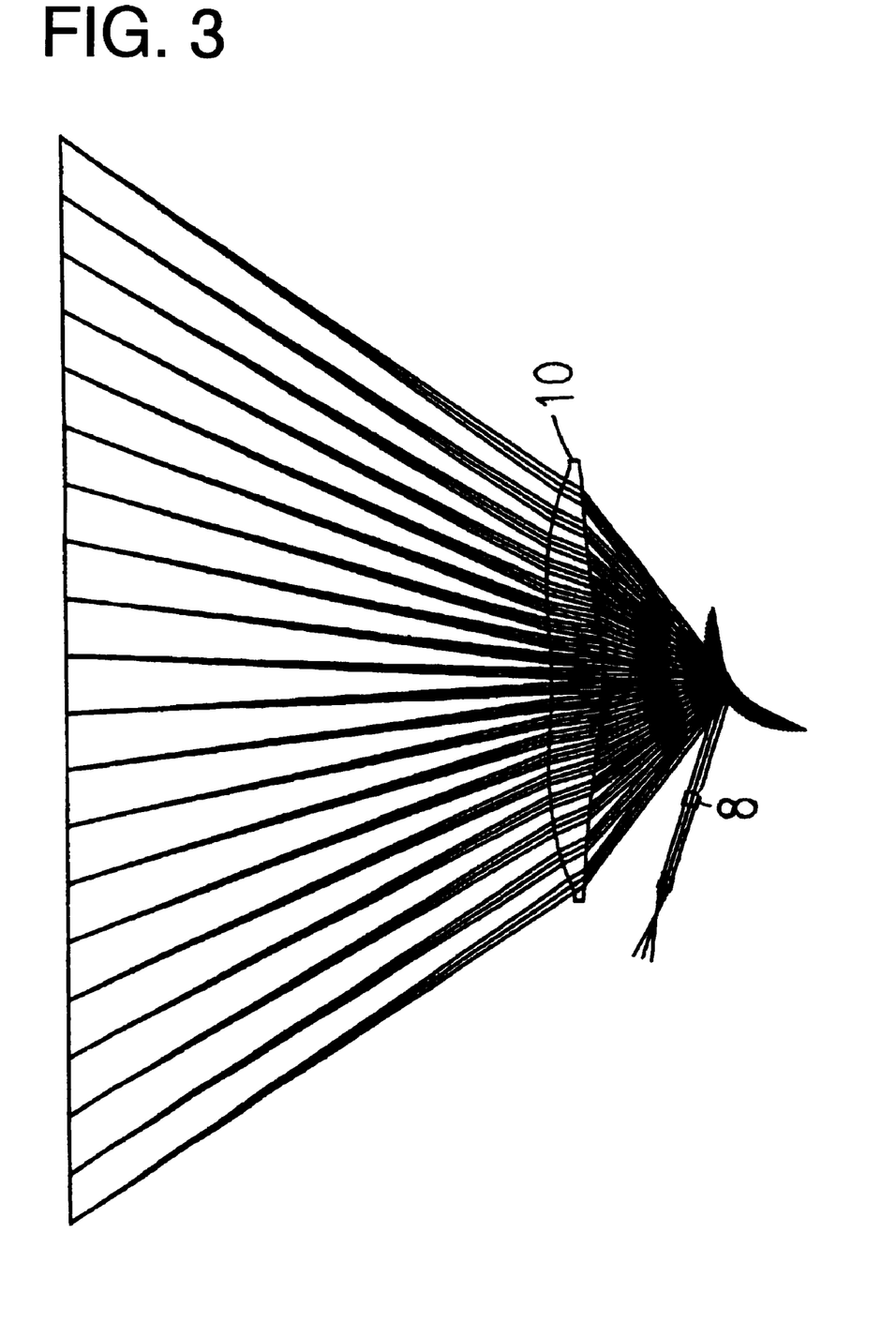
FIG. 3 is an optical path diagram of a scanning optical system according to an embodiment of the present invention.

As shown in FIG. 3 representing the optical path diagram of the scanning optical system of FIG. 1, when a beam light generating from the light source is incident to the polygon mirror in the main scanning direction at an angle α with respect to the optical axis of the fθ lens, each of the incident surface and the outgoing surface of the fθ lens is divided into two sections in the main scanning direction, and the resulting four surfaces are then designed separately so as to have a different coefficient that can be applied to the aspherical formula as defined above. As a result, the fθ lens is formed which has the left and right surfaces configured asymmetrically to each other.

Even when the left surface and the right surface of the fθ lens are designed so as to become asymmetrical to each other, the lens surface has the left and right surfaces coupled to each other continually at its common central portion. This can be realized by using common values for Cx, K, Cy, and Ky of each of the left and right surfaces of the fθ lens. This can be understood by substituting an X-coordinate value 0 of the central portion of the lens in the aspherical formula (1) as defined above.

The shape of the lens surface defined by the aspherical formula (1) can be formed into a desired freely curved surface extending each in the main scanning direction (the X-axis) and the sub-scanning direction (the Y-axis). Therefore, this easily realizes a lens performance required for high resolution including, for example, a reduction in a spot size and an improvement in linearity.

The shape of the fθ lens for the present invention can be represented in an ample way, in particular by having a term of an odd-numbered degree that has never been used for conventional fθ lenses for a scanning optical system, in addition to an even-numbered degree, contained in the n-th function, the 2j-th function, and the m-th function. The n-th function is to determine the free curve extending along the main scanning direction (the X-axis), the (2j)-th function is to optionally vary the eccentricity of the shape along the sub-scanning direction (the Y-axis) in accordance with the position X in the main scanning direction, and the m-th function is to optionally vary the curvature of the shape along the sub-scanning direction (the Y-axis) in accordance with the position X in the main scanning direction.

Therefore, the fθ lens according to the present invention can achieve a high level of resolution by an fθ lens in a single lens configuration even if its photosensitive surface becomes larger.

Then, a description will be made of conditions for achieving a particularly high level of precision for designing in the aspherical formula (1) as defined above. When the number of the terms for use in designing the sum of the n-th functions ($\Sigma A_n |X^n|$), the sum of the m-th function ($\Sigma B_m |X^m|$), and the sum of the 2j-th function ($\Sigma G_j X^{2j}$) is small, it is better in term of enabling an easy designing in a short period of time. However, a higher level of precision cannot be achieved if the number of the terms would be too small so that the number of the terms should be set to be a somewhat larger number. On the other hand, the lower the degree is, the easier the designing is. It has to be noted, however, that a higher level of precision could not be achieved unless a somewhat higher term should be used.

The standard for achieving a higher level of precision may vary with the number of terms to be used. In other words, 18 or larger terms are to be used for the sum of the n-th functions ($\Sigma A_n |X^n|$), 11 or larger terms are to be used for the sum of the m-th function ($\Sigma B_m |X^m|$), and 6 or larger terms are to be used for the sum of the 2j-th function ($\Sigma G_j X^{2j}$). For the degree of the term to be used, the sum of the n-th functions ($\Sigma A_n |X^n|$) contains a term of degree 20 or larger, the sum of the m-th function ($\Sigma B_m |X^m|$) contains a term of degree 12 or larger, and the sum of the 2j-th function ($\Sigma G_j X^{2j}$) contains a term of degree 12 or larger.

When the standard as defined above is applied by taking into account the conditions satisfying both reduction in designing time and improvements in precision, for instance, there may be used 18 terms of degree 3 to degree 20 for the sum of the n-th functions ($\Sigma A_n |X^n|$), 11 terms of degree 2 to degree 12 for the sum of the m-th function ($\Sigma B_m |X^m|$), and 6 terms of degree 2 to degree 12 for the sum of the 2j-th function ($\Sigma G_j X^{2j}$).

Moreover, when the beam light is incident to the polygon mirror from the direction crossing the light axis of the fθ lens, that is, it is incident thereto at the angle α, adverse influences of a deviation of a point of image formation upon optical performance due to a variation in the reflecting position on the polygon mirror with the reflecting angle can be removed in an appropriate way by making the left and right sides of each of the incident surface and the outgoing surface of the fθ lens asymmetrical to each other and establishing an aspherical formula for each surface.

BEST MODES OF CARRYING OUT THE INVENTION

FIG. 1 shows the overall configuration of the scanning optical system according to an embodiment of the present invention. In this embodiment, an fθ lens designed by using the aspherical formula of the present invention is incorporated.

Figure 2:
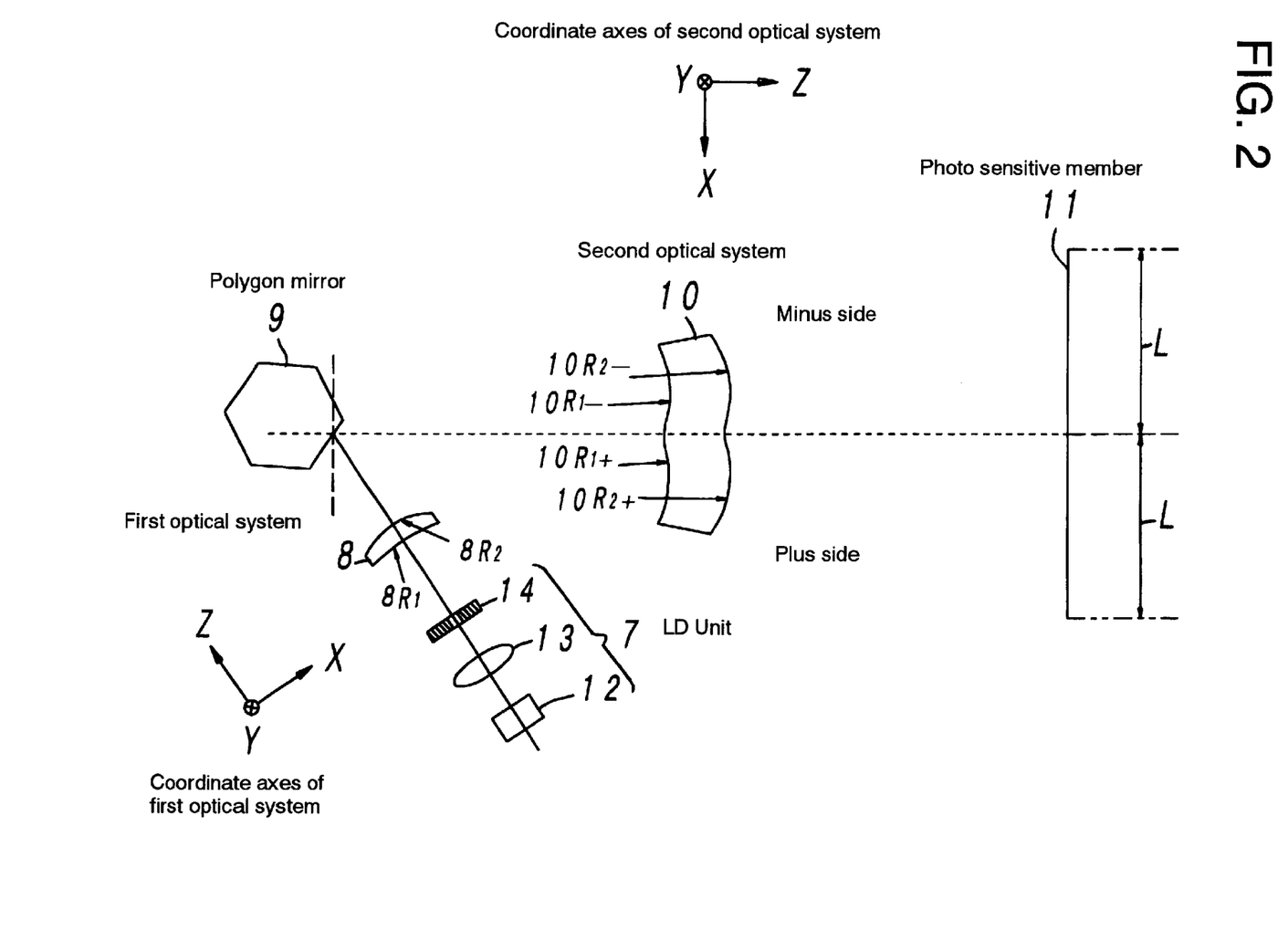
FIG. 2 is a view showing a rewritten version of FIG. 1 in order to clarify the dimensions of each portion.

As shown in FIG. 1, reference numeral 7 stands for an LD (laser diode) unit for forming a beam light with a light source installed therein, and reference numeral 8 for a first optical system which converges the beam light mainly in the sub-scanning direction (the direction of rotation of a photosensitive drum) and in the main scanning direction at a smaller convergence ratio. Reference numeral 9 stands for a polygon mirror acting as a light polarizing unit, reference numeral 10 for a second optical system composed of an fθ lens, and reference numeral 11 for a photosensitive member such as a printing drum, etc. FIG. 2 rewrites the configuration of FIG. 1 in order to clarify the portions to which the values of the design example of the present invention are applied. It is to be noted herein that FIG. 2 indicates the coordinate axes separately for the first and second optical systems because the light axis turns at the polygon mirror.

As shown in FIG. 2, the LD unit 7 comprises a semiconductor laser 12, a collimator lens 13 which converts the laser light into an approximately parallel light and a completely parallel light, and a diaphragm 14. The first optical system 8 uses a aspherical toric lens designed by the following formula:

$$Z = \frac{C_y Y^2}{1+\sqrt{1-(1+K)C_y^2 Y^2}} + \sum_{n=2}^{20} A_n Y^{2n} \quad C_y = 1/R_y$$

This formula defines a curve which rotates about a rotational axis extending along the sub-scanning direction (the Y-axis) and whose rotational lotus forms a toric surface, as shown in FIG. 4. In other words, the value obtained by adding the value Z of this formula to the radius of curvature Rx in the X-axial direction at the original position comprises a radius of curvature in the X-axial direction at each point of the Y-axial direction of the toric surface.

The polygon mirror 9 has its reflecting surface formed in a polygonal shape so that it rotates to assign and polarize the incident beam light into the main scanning direction X, i.e. in the axial direction of the photosensitive drum.

The second optical system 10 comprises an fθ lens designed by using the aspherical formula (1) as defined above. The fθ lens can converge the beam light both in the main scanning direction X and the sub-scanning direction Y and at the same time scan the converged beam light on the photosensitive member 11 to form an image thereon.

Next, a description will be made of optical performance for specific design examples of portions of the configuration of the scanning optical system as described above.

The first optical system 8 consisting of the aspherical toric lens and the second optical system 10 consisting of the fθ lens are each in a single lens configuration, in which f in the fθ characteristic for the entire optical system is set to be 169.93647 mm and the scanning width L on the photosensitive member 6 is set to be from −150 mm to +175 mm.

The LD unit 7 uses a semiconductor laser having the wavelength of 780 nm for the semiconductor laser 12. The use of this semiconductor laser gives each optical system a refractive index of 1.521224. The laser light is then converted into parallel light by using the collimator lens 13 having f=8 mm. The parallel light is then converted into the light having a truncade ratio (an LD waveform) of 0.367 in the main scanning direction and 0.728 in the sub-scanning direction by using the oval-shaped diaphragm 14 having distances of 3.0 mm in the main scanning direction and 1.897 mm in the sub-scanning direction.

The polygon mirror 9 comprises a mirror having a diameter of an inscribed circle of φ=34.6 mm and an outer peripheral surface of a hexagonal shape.

The aspherical toric lens acting as the first optical system 8 is configured such that each of the incident surface $8R_1$ and the ongoing surface $8R_2$ is of a aspherical toric shape as shown in FIG. 2 and that the shape thereof may be defined by the following radius Rx, aspherical coefficient An, and eccentricity K:

$8R_1$ (TR) X-axial direction: Rx=−9.6093E+00
   Y-axial direction: Cy=6.6787E −02
$8R_2$ (TR) X-axial direction: Rx=−1.0521E+01
   Y-axial direction: Cy=−1.6012E −02
   $A_4$=4.8430E −05
   $A_6$=6.7515E −06
   $A_8$=0
   $A_{10}$=0
   $A_{12}$=0
   $A_{14}$=0
   $A_{16}$=0
   $A_{18}$=0
   $A_{20}$=0

As indicated by the coordinate axes of the first optical system as shown in FIG. 1, the term "X-axial direction" is intended to mean a main scanning direction and the term "Y-axial direction" is intended to mean a sub-scanning direction.

The fθ lens acting as the second optical system 10 is configured such that the left-hand and right-hand portions, when seen toward the photosensitive member 11 from the polygon mirror 9, are designed separately by the aspherical formula (1) as defined above so as to be asymmetrical to each other. In Tables 1 to 4 below, each of the coefficients of the aspherical formula is indicated. The fθ lens has the LD unit 7 disposed on the side thereof so as to absorb and compensate for the adverse influences upon the optical performance due to the deviation of the position of the image-forming point on the photosensitive member 11 by transferring the reflecting point in the polygon mirror 9.

As indicated in Tables 1 to 4, reference symbol $10R_1$ sets forth an incident side and reference symbol $10R_2$ sets forth an ongoing side. A minus side corresponds to the left-hand side and a plus side to the right-hand side, when looked at the photosensitive member 11 from the polygon mirror 9. The relationships of the terms X, Y, and Z axis with each of the fθ lens surfaces are referred to in FIGS. 2 and 4.

TABLE 1

FREE CURVE SURFACE COEFFICIENTS FOR SECOND OPTICAL SYSTEM

| X-AXIAL DIRECTION | | $10R_1$ SURFACE | Y-AXIAL DIRECTION | | PLUS SIDE |
|---|---|---|---|---|---|
| Rx | = | 72.2425377 | Cy | = | −0.0436524 |
| K | = | −1.8891989 | Ky | = | 0.82773468 |
| A3 | = | 3.56E − 05 | G1 | = | −0.0521827 |
| A4 | = | −1.14E − 05 | G2 | = | 6.29E − 05 |
| A5 | = | 3.48E − 07 | G3 | = | −1.43E − 08 |
| A6 | = | −4.12E − 09 | G4 | = | −4.70E − 12 |
| A7 | = | 1.43E − 11 | G5 | = | 9.75E − 16 |
| A8 | = | −2.44E − 14 | G6 | = | 7.37E − 20 |
| A9 | = | 1.10E − 15 | | | |
| A10 | = | 6.00E − 18 | B2 | = | −8.70E − 05 |
| A11 | = | −1.24E − 19 | B3 | = | −0.0001998 |
| A12 | = | 8.72E − 24 | B4 | = | 1.53E − 05 |
| A13 | = | −1.44E − 25 | B5 | = | −4.79E − 07 |
| A14 | = | −2.38E − 27 | B6 | = | 7.24E − 09 |
| A15 | = | −2.87E − 29 | B7 | = | −4.53E − 11 |
| A16 | = | −2.76E − 31 | B8 | = | −5.16E − 14 |
| A17 | = | 5.63E − 34 | B9 | = | 2.87E − 16 |
| A18 | = | 5.61E − 35 | B10 | = | 2.30E − 17 |

TABLE 1-continued

FREE CURVE SURFACE COEFFICIENTS FOR SECOND OPTICAL SYSTEM

| X-AXIAL DIRECTION | | $10R_1$ SURFACE | Y-AXIAL DIRECTION | | PLUS SIDE |
|---|---|---|---|---|---|
| A19 | = | 1.80E − 36 | B11 | = | 9.14E − 21 |
| A20 | | 1.73E − 38 | B12 | = | −9.48E − 22 |
| | | | B13 | = | 0 |
| | | | B14 | = | 0 |
| | | | B15 | = | 0 |
| | | | B16 | = | 0 |
| | | | B17 | = | 0 |
| | | | B18 | = | 0 |
| | | | B20 | = | 0 |

TABLE 2

FREE CURVE SURFACE COEFFICIENTS FOR SECOND OPTICAL SYSTEM

| X-AXIAL DIRECTION | | $10R_1$ SURFACE | Y-AXIAL DIRECTION | | PLUS SIDE |
|---|---|---|---|---|---|
| Rx | = | 72.2425377 | Cy | = | −0.0436524 |
| K | = | −1.8891989 | Ky | = | 0.82773468 |
| A3 | = | 5.76E − 05 | G1 | = | −0.0521827 |
| A4 | = | −1.26E − 05 | G2 | = | 6.29E − 05 |
| A5 | = | 3.67E − 07 | G3 | = | −1.43E − 08 |
| A6 | = | −3.99E − 09 | G4 | = | −4.70E − 12 |
| A7 | = | 1.27E − 11 | G5 | = | 9.75E − 16 |
| A8 | = | −1.68E − 13 | G6 | = | 7.37E − 20 |
| A9 | = | 1.85E − 15 | | | |
| A10 | = | 4.82E − 17 | B2 | = | −0.0003784 |
| A11 | = | −5.22E − 19 | B3 | = | −0.0002088 |
| A12 | = | 1.17E − 22 | B4 | = | 1.51E − 05 |
| A13 | = | 6.14E − 26 | B5 | = | −4.64E − 07 |
| A14 | = | 1.15E − 28 | B6 | = | 7.19E − 09 |
| A15 | = | −1.1SE − 29 | B7 | = | −4.95E − 11 |
| A16 | = | −4.82E − 31 | B8 | = | 1.53E − 13 |
| A17 | = | −1.08E − 32 | B9 | = | −8.37E − 16 |
| A18 | = | −1.73E − 34 | B10 | = | −7.14E − 17 |
| A19 | = | −1.25E − 36 | B11 | = | 1.09E − 18 |
| A20 | | 4.34E − 38 | B12 | = | 1.32E − 23 |
| | | | B13 | = | 0 |
| | | | B14 | = | 0 |
| | | | B15 | = | 0 |
| | | | B16 | = | 0 |
| | | | B17 | = | 0 |
| | | | B18 | = | 0 |
| | | | B20 | = | 0 |

TABLE 3

FREE CURVE SURFACE COEFFICIENTS FOR SECOND OPTICAL SYSTEM

| X-AXIAL DIRECTION | | $10R_1$ SURFACE | Y-AXIAL DIRECTION | | PLUS SIDE |
|---|---|---|---|---|---|
| Rx | = | 150.215227 | Cy | = | −0.0766381 |
| K | = | −50.734816 | Ky | = | −0.7779917 |
| A3 | = | 9.66E − 05 | G1 | = | 0 |
| A4 | = | −1.32E − 05 | G2 | = | 0.00E + 00 |
| A5 | = | 5.53E − 07 | G3 | = | 0.00E + 00 |
| A6 | = | −1.43E − 08 | G4 | = | 0.00E + 00 |
| A7 | = | 2.28E − 10 | G5 | = | 0.00E + 00 |
| A8 | = | −1.81E − 12 | G6 | = | 0.00E + 00 |
| A9 | = | 2.09E − 15 | | | |
| A10 | = | 3.10E − 17 | B2 | = | 4.67E − 06 |
| A11 | = | 1.07E − 19 | B3 | = | −6.471E − 05 |
| A12 | = | −1.43E − 24 | B4 | = | 3.64E − 06 |
| A13 | = | −2.19E − 24 | B5 | = | −3.04E − 08 |
| A14 | = | 0.00E + 00 | B6 | = | −2.97E − 09 |
| A15 | = | 0.00E + 00 | B7 | = | 1.01E − 10 |
| A16 | = | 0.00E + 00 | B8 | = | −1.07E − 12 |
| A17 | = | 0.00E + 00 | B9 | = | −7.88E − 16 |
| A18 | = | 0.00E + 00 | B10 | = | 5.58E − 17 |
| A19 | = | 0.00E + 00 | B11 | = | 2.11E − 20 |
| A20 | | 0.00E + 00 | B12 | = | −8.55E − 23 |
| | | | B13 | = | 0 |
| | | | B14 | = | 0 |
| | | | B15 | = | 0 |
| | | | B16 | = | 0 |
| | | | B17 | = | 0 |
| | | | B18 | = | 0 |
| | | | B20 | = | 0 |

TABLE 4

FREE CURVE SURFACE COEFFICIENTS FOR SECOND OPTICAL SYSTEM

| X-AXIAL DIRECTION | | $10R_1$ SURFACE | Y-AXIAL DIRECTION | | PLUS SIDE |
|---|---|---|---|---|---|
| Rx | = | 150.215227 | Cy | = | −0.0766381 |
| K | = | −50.734816 | Ky | = | −0.7779917 |
| A3 | = | 1.07E − 04 | G1 | = | 0 |
| A4 | = | −1.31E − 05 | G2 | = | 0.00E + 00 |
| A5 | = | 5.32E − 07 | G3 | = | 0.00E + 00 |
| A6 | = | −1.39E − 08 | G4 | = | 0.00E + 00 |
| A7 | = | 2.31E − 10 | G5 | = | 0.00E + 00 |
| A8 | = | −1.91E − 12 | G6 | = | 0.00E + 00 |
| A9 | = | 1.74E − 15 | | | |
| A10 | = | 3.09E − 17 | B2 | = | −0.0001508 |
| A11 | = | 2.97E − 19 | B3 | = | −6.726E − 05 |
| A12 | = | −1.88E − 22 | B4 | = | 4.20E − 06 |
| A13 | = | −3.62E − 24 | B5 | = | −5.36E − 08 |
| A14 | = | 0.00E + 00 | B6 | = | −2.88E − 09 |
| A15 | = | 0.00E + 00 | B7 | = | 1.08E − 10 |
| A16 | = | 0.00E + 00 | B8 | = | −1.05E − 12 |
| A17 | = | 0.00E + 00 | B9 | = | −2.76E − 15 |
| A18 | = | 0.00E + 00 | B10 | = | 4.88E − 17 |
| A19 | = | 0.00E + 00 | B11 | = | 2.38E − 19 |
| A20 | | 0.00E + 00 | B12 | = | 1.01E − 24 |
| | | | B13 | = | 0 |
| | | | B14 | = | 0 |
| | | | B15 | = | 0 |
| | | | B16 | = | 0 |
| | | | B17 | = | 0 |
| | | | B18 | = | 0 |
| | | | B20 | = | 0 |

Optical performances obtained in the optical system of the above design example are described hereinbelow.

Figure 6:
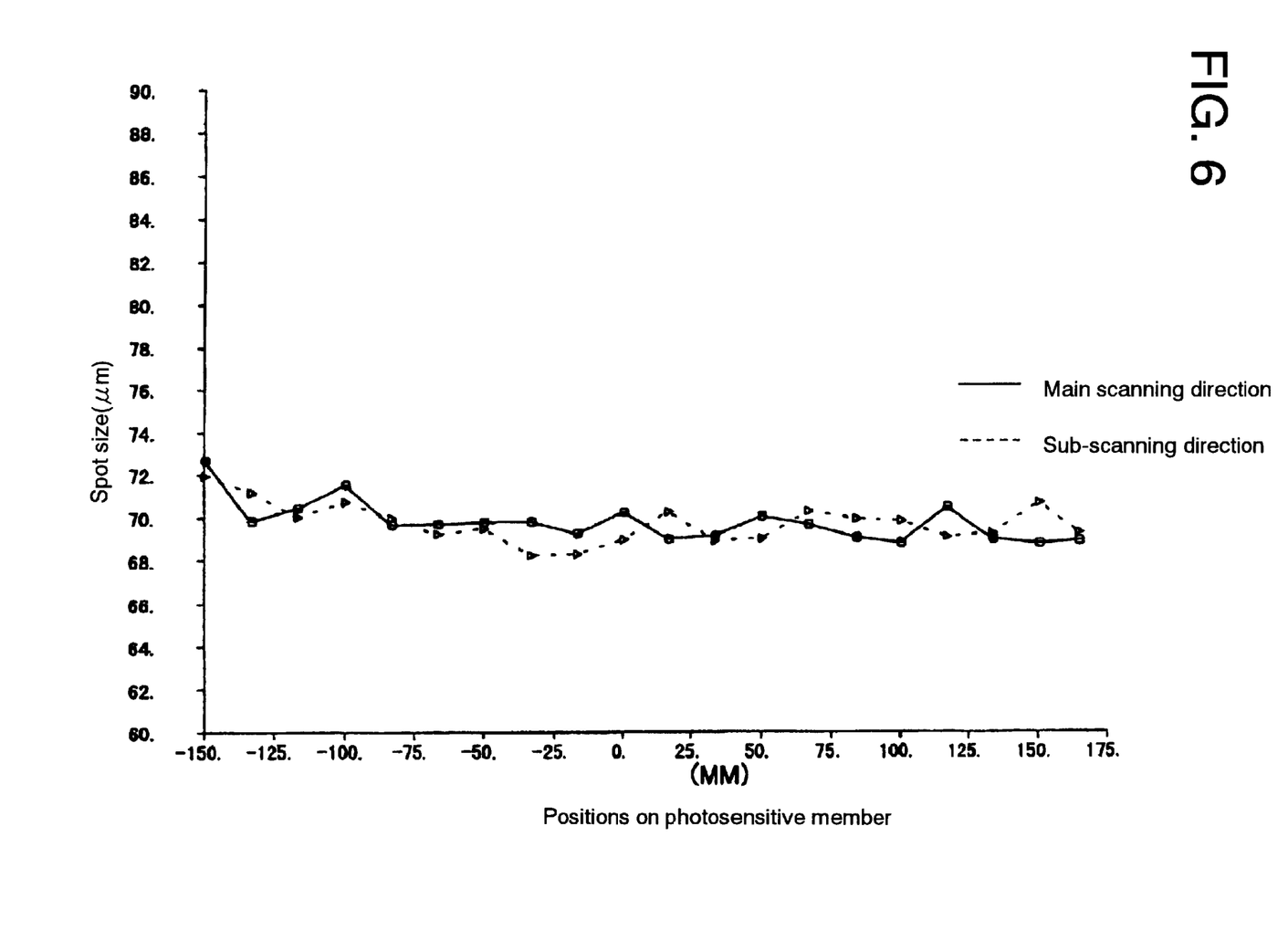
FIG. 6 is a view showing a spot size to be obtained by a design example of the present invention, when indicated in each of the main scanning direction and the sub-scanning direction.

As shown in FIG. 6, the size of the spot in which an image is formed on the photosensitive member may be: from 68.6 μm to 72.6 μm in the main scanning direction; and from 68 μm to 72 μm in the sub-scanning direction. The acceptable deviation of each spot size may be ±2 μm or less.

The spot size referred to herein may be determined by measuring the diameter of the region of an irradiating spot, in which the amount of energy of the irradiating light is set to be $1/e^2 = 13.5\%$ or higher, when the portion of the maximum energy is set to be 100%.

This configuration of the scanning optical system can reduce the spot to a size considerably smaller than the size of 120 μm as disclosed in the prior art as described above. Therefore, the scanning optical system according to the present invention can achieve printing of spots at a higher level of resolution.

Figure 7:
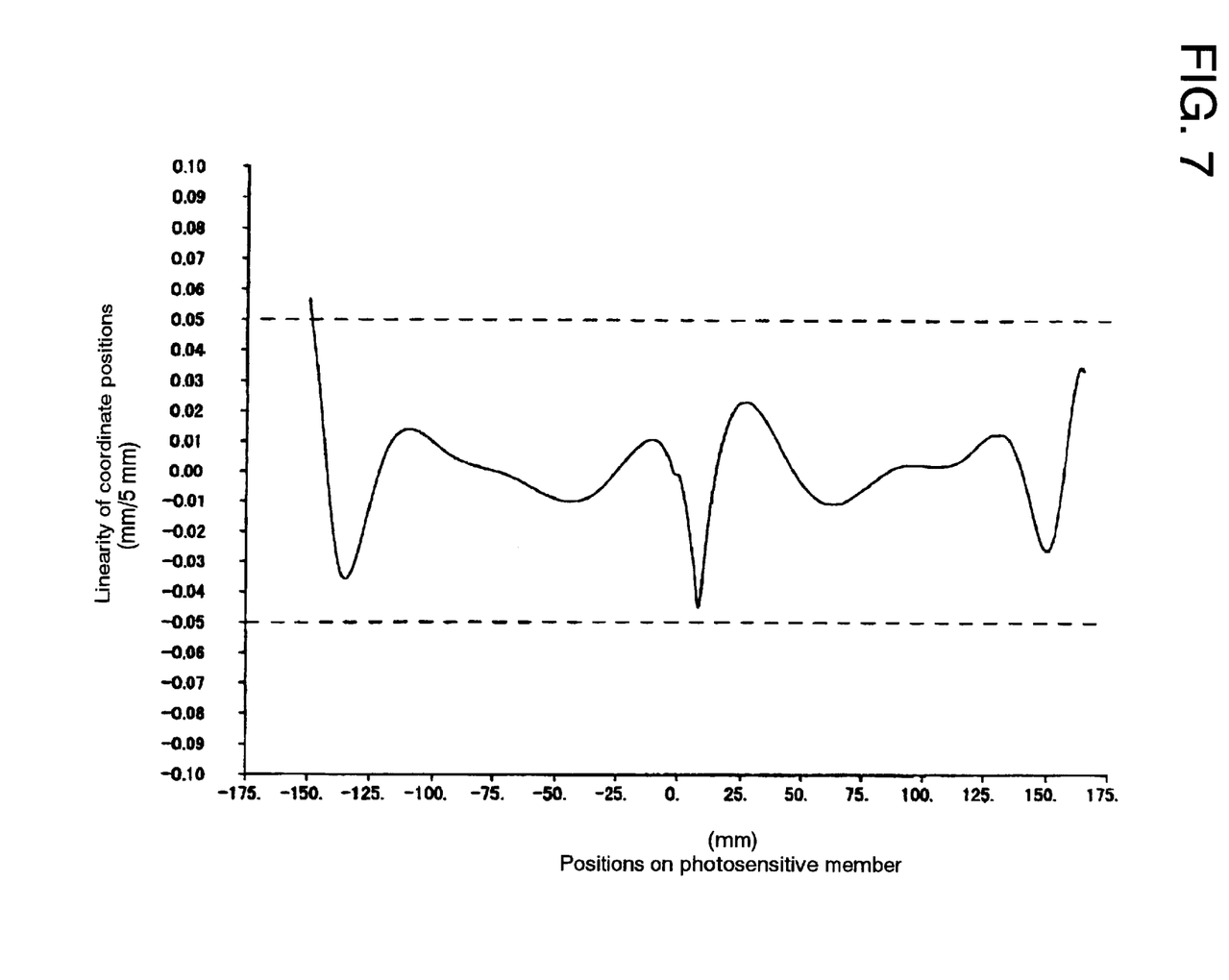
FIG. 7 is a view showing linearity characteristics of a design example of the present invention.

The linearity as determined in the scanning width L in the range of L=−150 mm to +175 mm can be found to be converged into the range of 0.06 mm or smaller, as shown in FIG. 7. This finds that the fθ lens can achieve a high level of precision even if it is of a single lens configuration.

Figure 8:
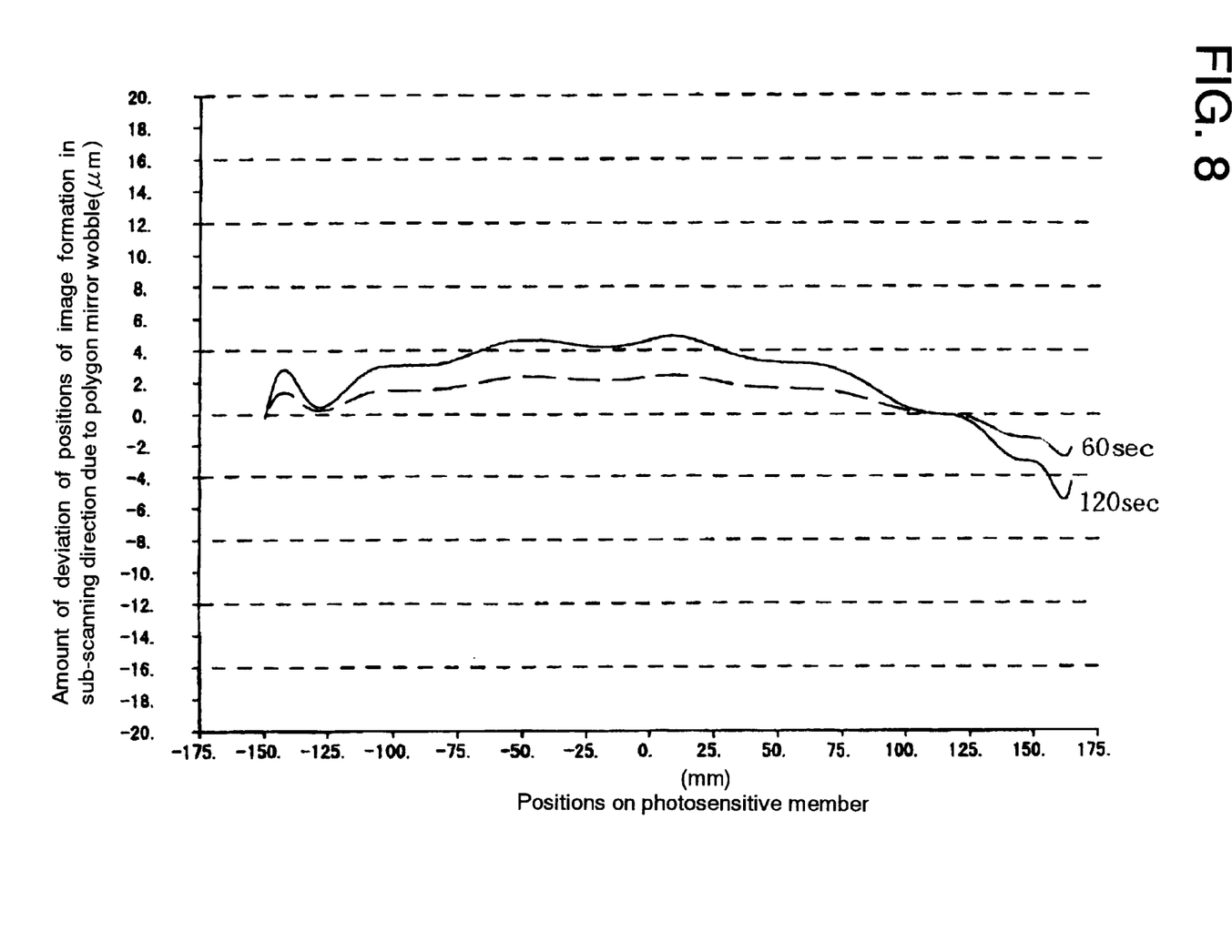
FIG. 8 is a view showing polygon mirror wobble characteristics of the design example of the present invention.

The compensation for polygon mirror wobble allows the deviation of the position of the image formation in the sub-scanning direction with respect to the polygon mirror wobble of 60 sec to be reduced to ±3 μm or smaller in the range of the scanning width L=−150 mm to +175 mm, as shown in FIG. 8.

Figure 9:
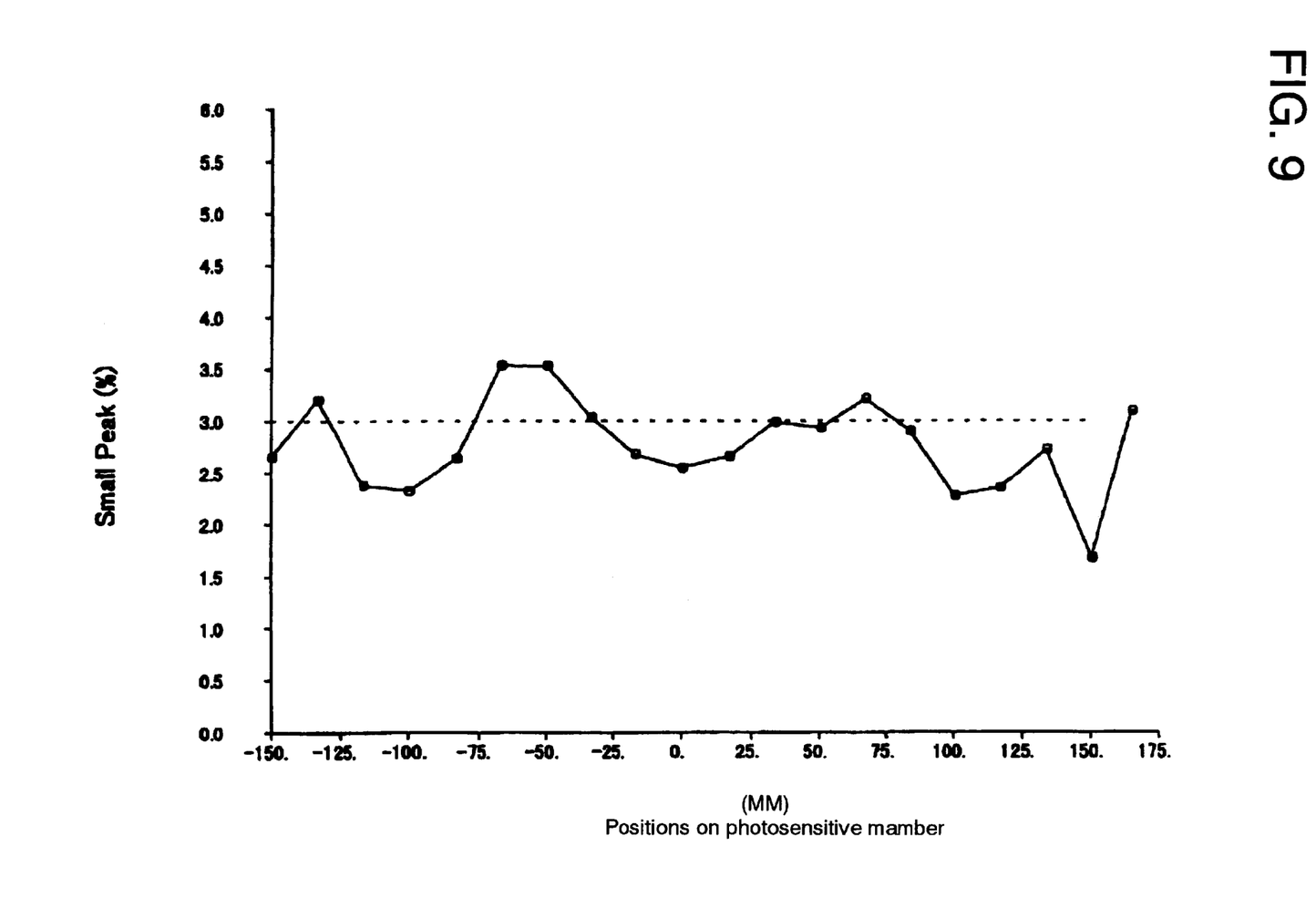
FIG. 9 is a view showing the status of occurrences of small peaks in the main scanning direction in the design example of the present invention.

As shown in FIG. 9, the small peak is set to be 4% or less with respect to the peak value (100%) of the spot light in the range of the scanning width L=−150 mm to +175 mm. The term "small peak" referred to herein is intended to mean a small peak where a distribution of intensity of the spot light irradiating on the photosensitive member does not constitute a Gauss distribution and which appears at a portion extending outside. If the small peak would become larger, the light may be irradiated on a portion on which no light is otherwise irradiated originally, and as a consequence the quality of the printing is caused to be lowered.

The scanning optical system according to the present invention can perform the quality of printing to an extent as equal to a conventional A43 paper size scanning optical system although the linearity, plane fall, and the size of the small peak have the scanning width set to be in the range of −150 mm to +175 mm in order for the fθ lens of a single lens configuration to correspond to an A-3 paper size. In other words, the scanning optical system according to the present invention can make a paper size larger without reducing the quality of printing even by the fθ lens of the single lens configuration.

It should be understood herein that the present invention is not restricted to the embodiment and the design examples as described above. For instance, the scanning optical system according to the present invention can be designed in an appropriate fashion by changing the number of the terms and the degrees of $\Sigma A_n|X^n|$, $\Sigma B_m|X^m|$ and $\Sigma G_j X^{2j}$ in the aspherical formula (1) representing the shape of the fθ lens acting as the second optical system so as to comply with a required level of precision. It is further possible to shorten the time required for designing and to decrease costs for designing without reducing a level of precision of designing to a great extent by setting the eccentricity Ky contained in the denominator of the third term in the aspherical formula (1) above to zero and reducing the number of coefficients to be determined at the time of designing.

Moreover, the present invention enables the fθ lens incorporated into the scanning optical system, the fθ lens being designed such that both the main scanning direction and the sub-scanning direction are each formed into a desired aspherical surface, and being formed by the aspherical formula having a high freedom of designing. Therefore, the present invention can provide the fθ lens of a single lens configuration, which can minimize the size of the spot required for high resolution and improve the linearity.

Furthermore, the present invention can remove the adverse influences upon the optical performance due to a deviation of the position of the image formation by shifts of the reflecting point when the beam light is irradiated onto the polygon mirror from the light source disposed on the side thereof by forming the left-hand side and the right-hand side of the fθ lens to become asymmetrical to each other.

What is claimed is:

1. A scanning optical system for scanning and forming an image on a photosensitive member through an fθ lens for converging a beam light and for implementing fθ compensation by reflecting a beam light generated from a light source with a rotating polygon mirror, wherein:

said fθ lens comprises a single lens designed by using an optional term containing an odd-numbered degree and an even-numbered degree for each of $\Sigma A_n|X^n|$, $\Sigma B_m|X^m|$, and $\Sigma G_j X^{2j}$ in an aspherical formula representing a shape of each of an incident surface or an outgoing surface of the fθ lens, which is represented as follows:

$$Z = \frac{C_x X^2}{1 + \sqrt{1-(1+K)C_x^2 X^2}} + \sum_{n=3}^{u} A_n |X^n| +$$

$$\frac{C_y Y^2 \left(1 + \sum_{m=2}^{w} B_m |X^m|\right)}{1 + \sqrt{1 - \left[1 + K_y\left(1 + \sum_{j=1}^{v} G_j X^{2j}\right)\right]\left[C_y^2 Y^2\left(1 + \sum_{m=2}^{w} B_m |X^m|\right)^2\right]}}$$

$$C_x = 1/R_x$$
$$C_y = 1/R_y$$

Origin: a crossing point of fθ lens and light axis, Z-axis: light axis direction, X-axis: main scanning direction, Y-axis: sub-scanning direction where Cx, K, An, Cy, Bm, Ky, and Gj are each an optional coefficient; and u, v, and w are each an integer.

2. The scanning optical system as claimed in claim 1, wherein 18 or more terms are used for $\Sigma A_n|X^n|$, 11 or more terms are used for $\Sigma B_m|X^m|$, and 6 or more terms are used for $\Sigma G_j X^{2j}$.

3. The scanning optical system as claimed in claim 1, wherein $\Sigma A_n|X^n|$ contains a term of degree 20 or higher, $\Sigma B_m |X^m|$ contains a term of degree 12 or higher, and $\Sigma G_j X^{2j}$ contains a term of degree 6 or higher.

4. The scanning optical system as claimed in claim 1, wherein 18 terms of degree 3 to degree 20 are used for $\Sigma A_n |X^n|$, 11 terms of degree 2 to degree 11 are used for $\Sigma B_m |Xm|$, and 6 terms of degree 2 to degree 12 are used for $\Sigma G_j X^{2j}$.

5. The scanning optical system as claimed in any one of claims 1 to 4, wherein said fθ lens is configured such that, when the beam light generated from the light source is incident to the polygon mirror at an angle in the main scanning direction with respect to a light axis of said fθ lens, said fθ lens has the incident surface and the outgoing surface of said fθ lens divided into the main scanning direction each into two sections to form four surfaces as a whole and that said four surfaces are designed so as for each surface to have a different coefficient applicable individually to the aspherical formula as defined above and to make a left-hand side thereof and a right-hand side thereof asymmetrical to each other.

\* \* \* \* \*